United States Patent
Vemulapalli et al.

(10) Patent No.: US 11,710,353 B2
(45) Date of Patent: Jul. 25, 2023

(54) SPOOF DETECTION BASED ON CHALLENGE RESPONSE ANALYSIS

(71) Applicant: Jumio Corporation, Palo Alto, CA (US)

(72) Inventors: Spandana Vemulapalli, Kansas City, MO (US); Reza R. Derakhshani, Shawnee, KS (US)

(73) Assignee: Jumio Corporation, Sunnyvale, CA (US)

(*) Notice: Subject to any disclaimer, the term of this patent is extended or adjusted under 35 U.S.C. 154(b) by 11 days.

(21) Appl. No.: 17/463,199

(22) Filed: Aug. 31, 2021

(65) Prior Publication Data
US 2023/0063229 A1    Mar. 2, 2023

(51) Int. Cl.
*G06K 9/62* (2022.01)
*G06V 40/40* (2022.01)
*G06V 40/16* (2022.01)

(52) U.S. Cl.
CPC ............ *G06V 40/45* (2022.01); *G06V 40/172* (2022.01); *G06V 40/174* (2022.01)

(58) Field of Classification Search
CPC .... G06V 40/174–40/176; G06V 40/40–40/45; G06V 40/16–40/179
See application file for complete search history.

(56) References Cited

U.S. PATENT DOCUMENTS

| | | | |
|---|---|---|---|
| 10,929,984 B2 * | 2/2021 | Zhang | G06V 20/40 |
| 2016/0019410 A1 | 1/2016 | Komogortsev | |
| 2019/0318077 A1 | 10/2019 | Narasimhan | |
| 2020/0057846 A1 * | 2/2020 | Gautam | G06V 10/25 |
| 2020/0342245 A1 | 10/2020 | Lubin et al. | |
| 2022/0207263 A1 * | 6/2022 | Vexler | G06N 20/00 |

OTHER PUBLICATIONS

Vaas, sophos.com [online], "Google files patent to let you unlock your phone by grimacing at it," Jun. 12, 2013, retrieved on Oct. 18, 2021, retrieved from URL<https://nakedsecurity.sophos.com/2013/06/12/google-files-patent-to-let-you-unlock-your-phone-by-grimacing-at-it/>, 11 pages.
PCT International Search Report and Written Opinion; Application No. PCT/US2022/041967 Jumio Corporation; International filing date of Aug. 30, 2022, dated Dec. 29, 2022, 13 pages.

* cited by examiner

*Primary Examiner* — Brian Werner
(74) *Attorney, Agent, or Firm* — Patent Law Works LLP

(57) ABSTRACT

Methods, systems, and computer-readable storage media for determining that a subject is a live person include capturing a set of images of a subject instructed to perform a facial expression. A region of interest for the facial expression is determined in a first image of the set, the first image representing a first facial state that includes the facial expression. A set of facial features is identified in the region of interest, the facial features being indicative of interaction between facial muscles and skin of the subject due to the subject performing the facial expression. A determination is made, based on the facial features, that the first image substantially matches a template image of the facial expression of the subject. Responsive to determining that the first image substantially matches the template image, identifying the subject as a live person.

17 Claims, 7 Drawing Sheets

SPOOF DETECTION BASED ON CHALLENGE RESPONSE ANALYSIS

TECHNICAL FIELD

This specification generally relates to security control using image capture devices.

BACKGROUND

Malicious actors have been known to attempt to breach the security of face recognition systems by using spoof representations of the face of an actual user. Such spoof representations may be referred to as presentation attack instruments, and can include, for example, images presented on a display device or printed as a photograph, or a mask.

SUMMARY

In one aspect, this document describes a method for controlling access to a secure system based on determining that a subject is a live person. The secure system is a system to which access is controlled, e.g. by using authentication and/or authorization of one or more users trying to access the system. The method includes providing instructions for performing a facial expression. A set of images of a subject is captured as a response of the subject to the instructions to perform the facial expression. A region of interest for the facial expression is determined in a first image of the set, the first image representing a first facial state that includes the facial expression. A set of facial features is identified in the region of interest, the facial features being indicative of interaction between facial muscles and skin of the subject due to the subject performing the facial expression. A determination is made, based on the facial features, that the first image substantially matches a template image of the facial expression of the subject. Responsive to determining that the first image substantially matches the template image, identifying the subject as a live person.

In another aspect, this document describes a system for controlling access to a secure system based on determining that a subject is a live person. The system includes one or more computers; and one or more computer memory devices interoperably coupled with the one or more computers and having tangible, non-transitory, machine-readable media storing one or more instructions that, when executed by the one or more computers, perform various operations. The operations include providing instructions for performing a facial expression. A set of images of a subject is captured as a response of the subject to the instructions to perform the facial expression. A region of interest for the facial expression is determined in a first image of the set, the first image representing a first facial state that includes the facial expression. A set of facial features is identified in the region of interest, the facial features being indicative of interaction between facial muscles and skin of the subject due to the subject performing the facial expression. A determination is made, based on the facial features, that the first image substantially matches a template image of the facial expression of the subject. Responsive to determining that the first image substantially matches the template image, identifying the subject as a live person.

In another aspect, this document describes one or more non-transitory computer-readable storage devices coupled to one or more processors and having instructions stored thereon which, when executed by the one or more processors, cause the one or more processors to perform various operations. The operations include providing instructions for performing a facial expression. A set of images of a subject is captured as a response of the subject to the instructions to perform the facial expression. A region of interest for the facial expression is determined in a first image of the set, the first image representing a first facial state that includes the facial expression. A set of facial features is identified in the region of interest, the facial features being indicative of interaction between facial muscles and skin of the subject due to the subject performing the facial expression. A determination is made, based on the facial features, that the first image substantially matches a template image of the facial expression of the subject. Responsive to determining that the first image substantially matches the template image, identifying the subject as a live person.

Implementations of the above aspects can include one or more of the following features. Determining that the first image substantially matches the template image can include: determining a matching metric as a function of a similarity of the first image to the template image; determining that the matching metric satisfies a threshold condition; and determining that the first image substantially matches the template image in response to determining that the matching metric satisfies the threshold condition. The matching metric can be a function of a dissimilarity of the first image to a second image of the set, the second image representing a second facial state that lacks the facial expression. The dissimilarity of the first image to the second image is calculated based on the facial features in the region of interest. The facial expression can be one of: a smile, a scowl, a frown, or raising eyebrows. The computer-implemented method can include determining a presence of at least one transitional state as the subject's face changes to the first facial state from a second facial state that lacks the facial expression. The matching metric can include a score indicative of a degree of continuity from the second facial state to the first facial state.

Particular implementations of the subject matter described in this disclosure can be implemented so as to realize one or more of the following advantages. Subject specificity of the dynamics of a particular facial expression—e.g., interaction between facial muscles and skin mechanics, the compression-induced frown lines and wrinkles etc.—can be leveraged to implement a liveness detection system that reduces vulnerabilities against sophisticated presentation attacks. For example, facial expression-based biometric systems (e.g., one that depends on analyzing users' smiles) may be subjected to sophisticated presentation attacks that use face swap (or swap of a portion of a face) or non-rigid 3D masks to simulate applicable facial expressions. The technology described herein leverages particular dynamics of the facial expressions (e.g., frown lines, wrinkles etc. that are dependent on the interaction between facial muscles and skin mechanics of individual users) to perform liveness detection. Such subject-specific features are challenging to replicate even in sophisticated presentation attacks, and as such, the technology described herein may improve liveness/spoof detection functionalities of biometric systems, making the systems more robust against presentation attacks. By allowing a quick discrimination between captured images of a live person and captured images of a spoof alternative representation, additional processing can be preemptively terminated, thereby creating an additional layer of security.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
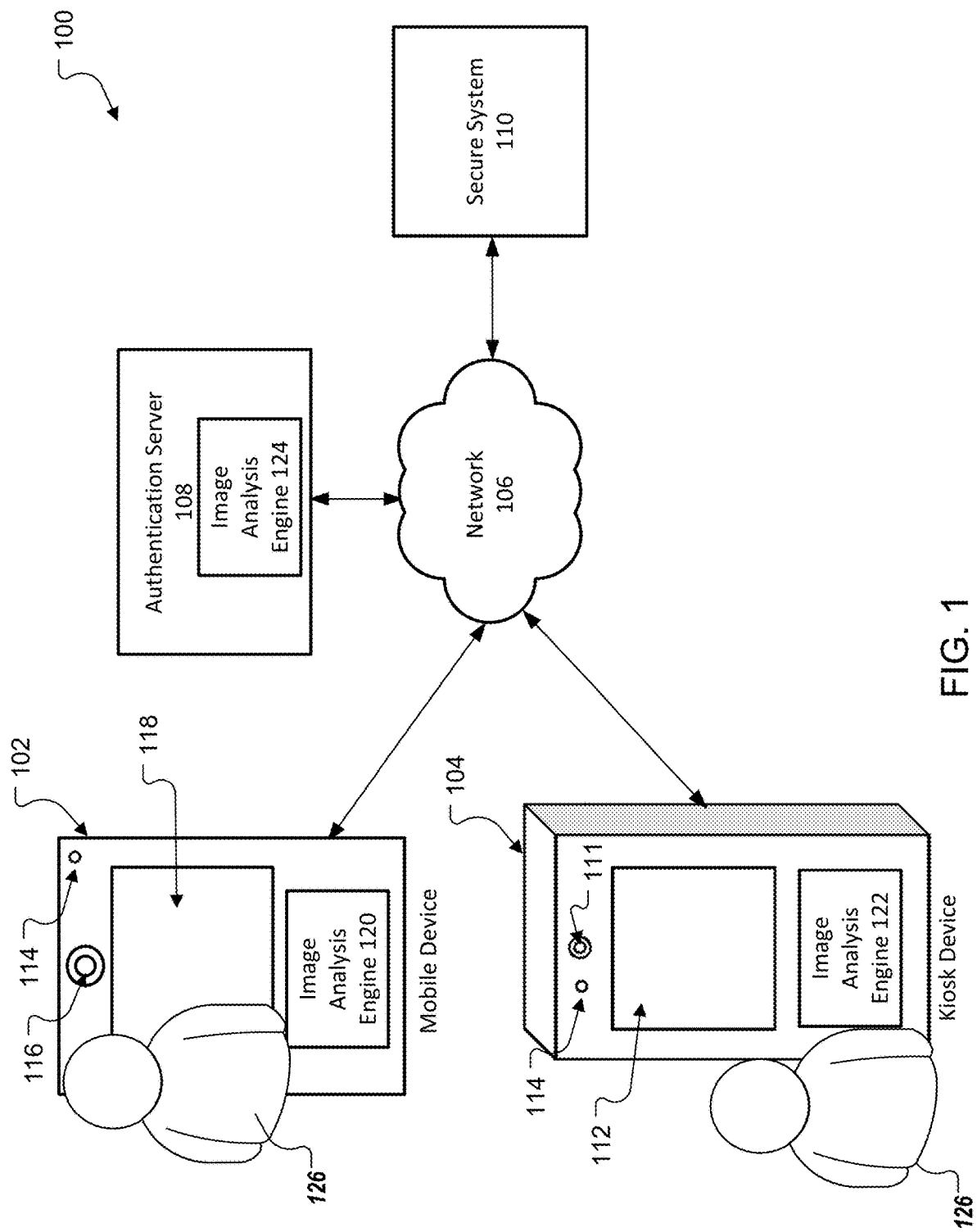
FIG. 1 depicts an example architecture in which the implementations of the present disclosure may be used.

Malicious attempts to breach the security of a biometric authentication system can include presenting an alternative representation of a live person in an attempt to trick the biometric authentication system into determining the alternative representation as a live person. Examples of such alternative representations (also referred to as spoof alternative representations, presentation attack instruments, or simply spoof) can include a printout of the live person, an image displayed on a display device, or even a 3D representation such as a mask. The alternative representation of the live person can be used to gain access to an account or other privileges associated with the identity of the corresponding live person. Actions including impersonation of a live person to gain access to secured data are generally known as spoof attacks or presentation attacks. The reliability and security of a biometric authentication system can depend on the ability of the system to differentiate between a live person and corresponding alternative representations (also referred to as spoofs). Such capabilities of a secure system to detect whether or not a subject is a real live person are referred to as liveness detection (or spoof detection—if the detection mechanism flags presentation attack instruments).

Biometric systems that rely on facial expressions (e.g. systems that analyze characteristics of particular expressions such as smiles or frowns) have been known to be breached by sophisticated presentation attack instruments such as photographic representations that have pre-existing facial expressions (e.g., face or face part swaps), and/or non-rigid 3D face masks. For example, in a face swap type presentation attack on a biometric system that requires a user to smile, the image of a face of a user can be replaced with a different image that represents another spoof image of the user with a smiling expression. In a partial face swap type presentation attack, the mouth region of an image of a user may be replaced by a smile. In still other types of presentation attacks, a non-rigid 3D mask can be used to represent a smile of the user. However, even such sophisticated presentation attacks would not typically account for subtle user-specific features associated with the corresponding facial expressions. The technology described herein leverages such user-specific features (e.g., the interaction between facial muscles and skin mechanics, the compression-induced frown lines and wrinkles) associated with particular facial expressions to test for liveness. Specifically, by determining a matching metric that is based not only on the presence of the user-specific features associated with a gesture or expression (e.g., as determined by comparing a run-time image of a gesture/facial expression to an enrollment template), but also the absence of such features (as determined by comparing a run time image of the gesture/facial expression to another run-time image that does not include the particular gesture/expression), robustness against the foregoing presentation attacks can be improved. In addition, vulnerabilities against 2D face swaps (e.g., displaying two images sequentially—one with an initial neutral expression and then another with a desired expression) can be improved by detecting one or more interim states between an initial facial state and the final facial state with the desired expression, and computing a continuity score that quantifies the continuity of a user's transition from the initial facial state to the final facial state. Such continuity scores can be used to detect abrupt changes such as those associated with 2D face swaps and therefore improve robustness against face swap type presentation attacks.

FIG. 1 depicts an example architecture 100 in accordance with implementations of the present disclosure. In the depicted example, the example architecture 100 includes user devices 102, 104, a network 106, an authentication server 108, and a secure system 110. In the depicted example, a user 126 interacts with the user devices 102, 104.

In some implementations, the user devices 102, 104 can communicate with the authentication server 108 and the secure system 110 over the network 106. The network 106 includes one or more of the following: a local area network (LAN), wide area network (WAN), the Internet, a virtual private network (VPN), etc., or a combination thereof. The network 106 connects user devices (e.g., the user device 104, or the user device 102, etc.), the authentication server 108, and the secure system 110. In some implementations, the network 106 can be accessed over a wired and/or a wireless communications link.

In some implementations, the user devices 102, 104 include any appropriate type of computing devices such as a desktop computer, a laptop computer, a handheld computer, a tablet computer, a personal digital assistant (PDA), a cellular telephone, a wearable device (e.g., smart watch or smart glasses), a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the user device 102 can be a mobile device. The user device 102 can be used for various purposes that require authenticating users 126 via one or more liveness detection processes. For example, the user device 102 can be used to authenticate a user for one or more services (e.g., a payment processing service) that are available to the user 126 via an application executing on the user device 102. The application executing on the user device 102 can require the user to perform a liveness detection process before allowing access to a secure system 110 associated with requested services. In some implementations, a liveness detection process that is based on a facial expression and may require multiple captures of a facial image of the user 126.

The user device 102 (e.g., mobile device) can include a camera 116 that can be employed to capture images of the user 126 of the user device 102. The user device 102 can include a display screen 118 (e.g., a touch screen) that allows a user to interact with the user device 102, e.g., performing a payment process on the mobile device. The user device 102 can be configured to capture one or more facial expressions of a subject to perform liveness detection in accordance with technology described herein. The user device 102 can provide audio and/or visual instructions to the user 126 to execute the selected facial expressions using the display panel 118 or a speaker 114. In some implementations, the user device 102 can show written instructions or icons on the display panel 118 and use the display panel 118 to guide the user 126 to execute the facial expressions. In some implementations, the user device 102 can include a speaker 114 that can provide audio commands to guide the user 126 to execute the facial expressions. Although one speaker 114 is shown in FIG. 1, the device 102 may include multiple speakers. The user device 102 can use the camera 116 to capture one or more images of the face of the subject 126.

In some implementations, the user device 104 (e.g., a kiosk device) can be used for various processes that require authenticating users 126 via one or more liveness detection processes. For example, the user device 104 can include an ATM that allows a user 126 to withdraw money from a bank account. In another example, the user device 104 can be deployed at a service or asset providing location (e.g., restaurant or a fast-food outlet), and can allow a user 126 to order and purchase a service or an asset (e.g., merchandise or food). The user device 104 can also be deployed at an entry point of an event center or a service center (e.g., at the gate of an arena, a convention center, a stadium, a transportation station or airport) or at various types of locations to authenticate users interactively, or even without any active participation of the user.

In some implementations, the user device 104 can include one or more components and features that support a liveness detection system. The user device 104 can include a camera 111. The camera 111 can be employed to capture images of, for example, users 126 interacting with the user device 104 or being in the proximity the user device 104. The user device 104 can include a display panel 112 (e.g., a capacitive touch screen) that allows a user to interact with the user device 104, e.g., selecting and ordering food at a retail outlet. Once the user completes the interaction via user-interfaces presented on the display panel 112, the user may be provided with instructions to perform one or more operations (e.g., look towards the camera 111 and perform a particular facial expression such as a smile or frown) for liveness detection. The liveness detection process performed using example architecture 100 shown in FIG. 1 can include a liveness detection process. One or more images captured using the camera 111 can be analyzed to determine whether the images captured using the camera 111 correspond to an actual live person or if the images correspond to an alternative representation of the live person. For example, an alternative representation of a live person can be a 2D representation (e.g., a photograph) or a 3D representation (e.g., a mask) of the live person displaying one or more facial expressions.

The user device 104 can provide audio and/or visual instructions to the user 126 to execute the selected facial expressions using the display panel 112 or a speaker 114. In some implementations, the user device 104 can show written instructions or icons on the display panel 112 and use the display panel 112 to guide the user 126 to execute the facial expressions. In some implementations, the user device 104 can include a speaker 114 that can provide audio commands to guide the user 126 to execute the facial expressions. Although one speaker 114 is shown in FIG. 1, the device 104 may include multiple speakers.

The images captured by the user device can be analyzed using an image analysis engine (e.g., image analysis engine 120, 122, or 124). The image analysis engine 120, 122, or 124 can extract a set of points of interest and, optionally, their temporal displacement. The image analysis engine 120, 122, or 124 can use the points of interest to determine expression features (e.g., frown lines, displacement of particular points etc.) and compare the features to those in a template (e.g., an enrollment image of the particular facial expression) or to another image of the user that lacks the particular expression. Because these comparisons are based on subject-specific features that are difficult to replicate in a presentation attack instrument, a result of the comparisons can be used to determine whether the user 126 is a real person or an alternative representation of a live person (e.g., an image or a mask impersonating a different person).

In some implementations, the image analysis engine can be located at a remote location with respect to the user device 102 or 104. For example, the image analysis engine 124 can be implemented on a server that is remotely located with respect to a user device 102 or user device 104 on which the sequence of images is captured. As shown in FIG. 1, for example, the image analysis engine 124 can be implemented on the authentication server 108. In such cases, the user devices 102 or 104 can communicate with the image analysis engine 124 over one or more networks 106.

In some implementations, at least a portion of the image analysis engine can be located on the same user device 102, 104 that captured the sequence of images. For example, the user devices 102, 104 can include an image analysis engine 122 that can extract a set of points of interest defining the facial expression of the subject. The user devices 102, 104 can send the points of interest over the network 106 to the authentication server, instead of sending the sequence of images, reducing the traffic on the network 106. After receiving the points of interest, the image analysis engine 124 on the authentication server 108 can process the points of interest using a machine-learning algorithm trained to discriminate between images of live people and images of alternative representations of live people.

In some implementations, an image analysis engine can be configured to evaluate the smoothness of transitions between facial expressions, for example, by detecting one or more interim facial states between two facial states. For example, the image analysis engine can be configured to detect, from multiple images, an interim facial state between a neutral facial state and an expressive facial state such as a smile or frown. Because a corresponding presentation attack such as a face swap is likely to simply replace a first image of the neutral facial expression with another image of a smile, the presence of the one or more interim states may be indicate that the subject is a live human being. In some implementations, the user devices 102, 104 can perform the entire liveness detection process within the user device 102, 104, including generating the gesture motion and determining whether the user 126 is an alternative representation of a live person using a trained machine-learning algorithm.

In accordance with implementations of the present disclosure, the authentication server 108 controls whether user devices 102, 104 can have access to the secure system 110. For example, the image analysis engine 120, 122, 124 can determine that the facial expressions of the user 126 in the captured images correspond to an alternative representation of a live person. This in turn can be an indicator of a malicious attempt of unauthorized access to the secure system 110, in which the perpetrator of the attempt points the user device 102, 104 towards a high quality photograph of an authorized user that is printed on paper, or one or more images of the authorized user displayed on a high-resolution display panel or 3D rigid or non-rigid masks. In response to determining that the user 126 is an alternative representation of a live person, the image analysis engine 120, 122, 124 can preemptively prevent any of the images to be further processed by the authentication server 108, thereby controlling access to the secure system 110. If the image analysis engine 120, 122, 124 determines that the images of the user 126 correspond to a live person, an authentication process based on one or more images of the user 126 can be initiated (e.g., at the authentication server 108) to determine if the live person is authorized to access the secure system. For example, after determining the liveness detection result, the user device 102 or the user device 104 can send the liveness detection result to the authentication server 108 over a network 106. Based on the liveness detection result, the authentication server 108 can allow or prevent access to the secure system 110.

Figure 2A:
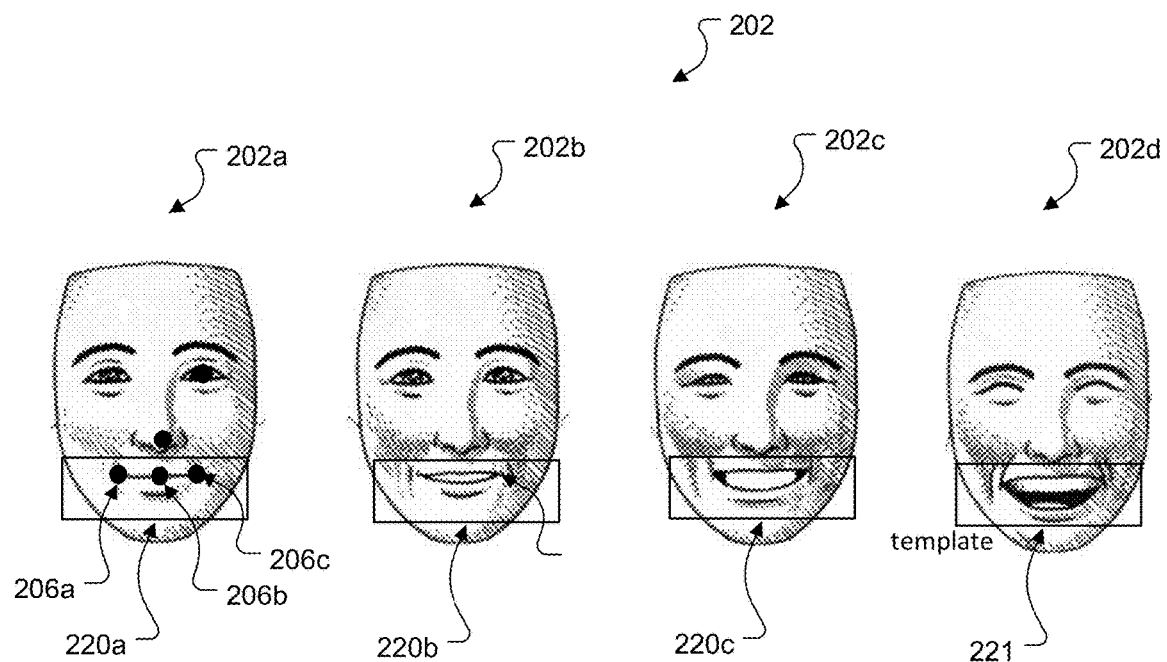
FIGS. 2A and 2B are examples of images representing examples of facial expressions.
Figure 2B:
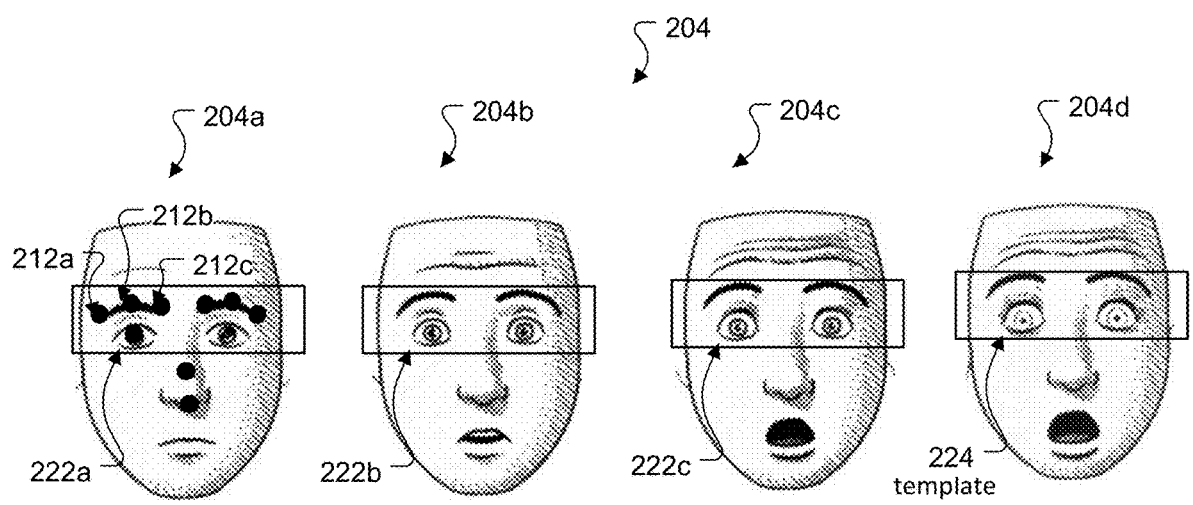

FIGS. 2A and 2B show examples of images that may be used for liveness detection based on analyzing a facial expression (e.g., smile or surprise). Specifically, the images 202a-202d (202 in general) represents a smiling subject and the images 204a-204d (204 in general) represents a subject raising eyebrows. While these specific facial expressions are shown and described for illustration purposes, other facial expressions such as scowls, frowns etc. can also be used in some implementations without deviating from the scope of the technology.

While each of FIGS. 2A and 2B shows multiple images, some implementations of the technology described herein may use more or less number of images. For example, in some implementations, an image of a portion of a subject's face including a particular facial expression (e.g., smile or frown) captured during runtime (e.g., the image 202c) can be compared with a template image of the portion of the subject's face showing the same facial expression (e.g., the template image 221 captured from the image 202d), wherein the template image 221 is captured during an enrollment process. In some implementations, a region of interest captured from a first image of a subject (e.g., the image 202c or the image 204c) with a particular facial expression captured during runtime can be compared with a corresponding region of interest in a second image (e.g., the image 202a or the image 204a, respectively)—also captured during runtime—that does not include the particular facial expression. In such cases, the difference between the region of interest in the first image and the region of interest in the second image may be leveraged to detect gesture-specific features that are difficult (or in some cases potentially impossible) to replicate in presentation attack instruments. In some implementations, both the similarities with a template image as well as the differences between two runtime images can be used in conjunction to leverage the subject's gesture-specific features (frown lines, creases in skin, contortions, brow shapes etc.) to determine whether the subject is indeed a real human user or a presentation attack instrument attempting to impersonate a real human user.

In some implementations, one or more points of interest (or landmarks) can be used to extract or crop a region of interest 220a, 220b, 220c (220, in general) from each captured image. The region of interest 220 can depend on the particular facial expression being used. For example, for a liveness detection process that analyzes a smile, the region of interest 220a, 220b, 220c, 220d can be a region around the mouth of a subject, as illustrated in FIG. 2A. In another example, for a liveness detection process that analyzes facial features associated with raised eyebrows, the region of interest can be a region 222a, 222b, 222c (222, in general) around the eyes or eyebrows of a subject. Examples of such regions of interest 222 are shown in FIG. 2B. The landmarks for extracting regions of interest for a smile-based analysis can be one or more points 206a, 206b, 206c etc. (206, in general) on or around the lips. Similarly, for a frown or raised-brow based analysis the landmarks can be one or more points 212a, 212b, 212c etc. (212, in general) on or around the eyes or eyebrows of the subject. In some implementation, the eye or eyebrow region can be extracted based on eye-centers. In some implementations, the region of interest can be the entire face of the user. The regions of interest 222 can be compared with a template region of interest 224 extracted from an image 204d captured during an enrollment process.

Figure 3A:
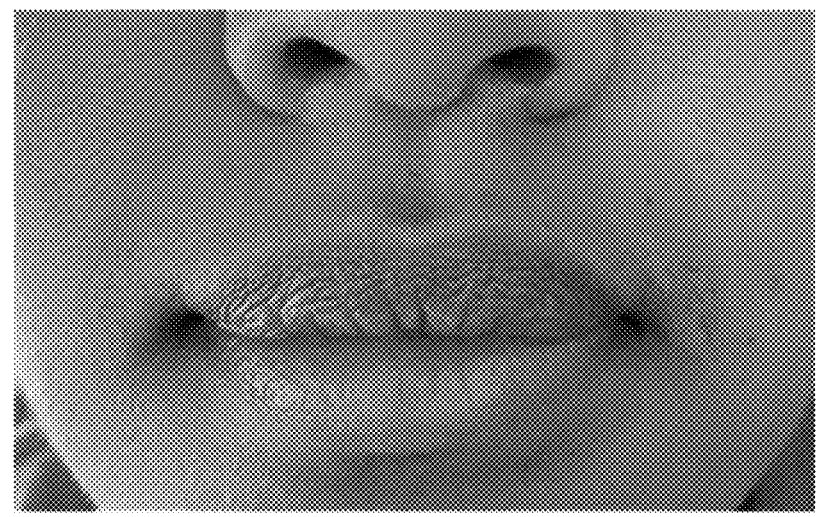
FIGS. 3A and 3B are examples of images representing examples of facial expressions.
Figure 3B:
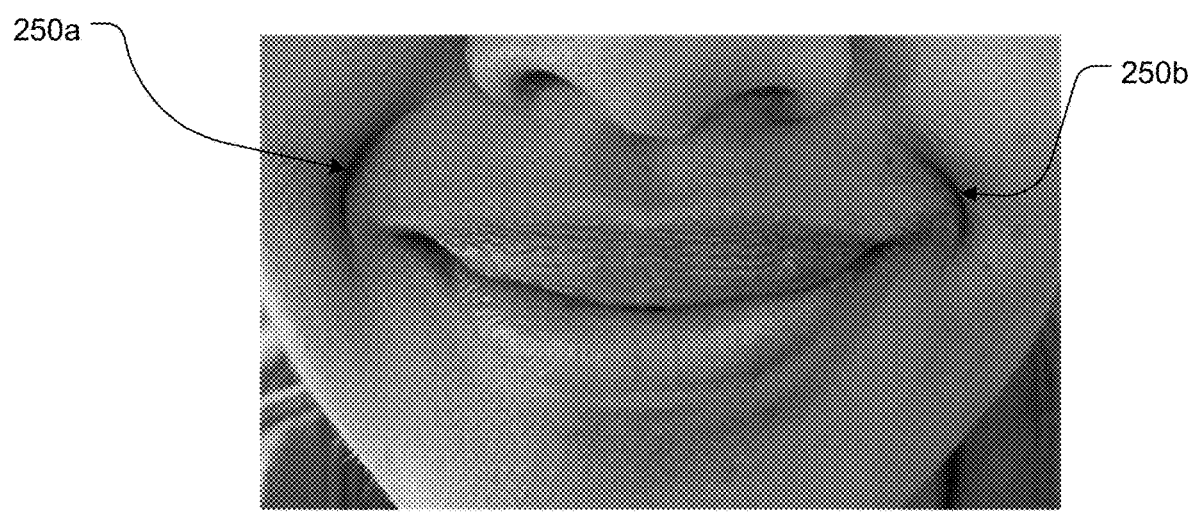
Figure 4A:
FIGS. 4A and 4B are examples of images representing examples of facial expressions.
Figure 4B:
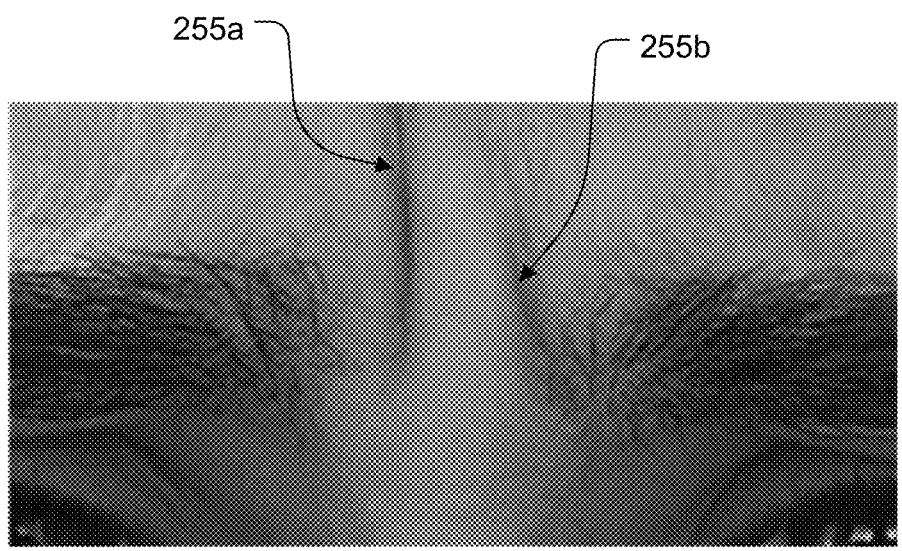

Once a region of interest is identified, one or more metrics based on features of the region of interest may be computed to determine whether the subject is a live person or a presentation attack instrument. Given the subject specificity of the interaction between facial muscles and skin mechanics, the compression-induced lines and the corresponding texture are typically also subject specific. Examples of such lines 250a and 250b (250, in general)—which are curved vertical lines originating from the sides of the nose to chin in the case of a smile 304—are shown in FIGS. 2A and 3B. Additional examples of such lines 255a and 255b (255, in general)—which may be referred to as frown lines in the corresponding facial expression 404—are shown in FIG. 4B. Such lines are typically not present in a neutral expression 302, 402, as evident from FIGS. 3A and 4A, respectively. Such subject-specific wrinkle lines can constitute a pattern that may be challenging to be replicated in presentation attack instruments such as masks or other 3D spoofs. In particular, if a deep learning model such as a convolutional neural network (CNN) is used to learn subject specific features like deformation, moles and textures differences, etc., replicating such features accurately in a presentation attack instrument may be virtually impossible. As such, the technology described herein may improve liveness detection by considering combinations of subject's gesture-specific features that may not be accounted for by existing liveness detection technologies.

In some implementations, a captured image can be matched with a template image captured during enrollment and/or another image captured during run-time/verification in determining whether the subject is a real human being. For example, mouth landmarks (e.g., the ones represented by the points 206 in FIG. 2A) can be used to crop/extract the desired region of interest (including a particular expression) from a captured image and then matched with a corresponding region of interest (including the same particular expression) from an enrollment template image (e.g., the image 202d in FIG. 2A) to determine a similarity score. In another example, eye landmarks (e.g., the ones represented by the points 212 in FIG. 2B, or the eye centers) can be used to crop/extract the desired region of interest from a captured image and then matched with a corresponding region of interest from an enrollment template image (e.g., the image 204d in FIG. 2B) to determine a similarity score. In some implementations, a dissimilarity score with another image captured during runtime is calculated for use in place of, or in conjunction with, the similarity score. The dissimilarity score can be an enrollment-free metric that expresses a lack of change (due to 3D mask attack) in the region of interest.

For example, the dissimilarity between a particular facial expression (a smiling image 202d in FIG. 2A) can be compared with a neutral expression (e.g., neutral expression 202a in FIG. 2A) to determine if the change is consistent with that expected for a real human being. In some implementations, a hybrid liveness score can be determined based on the captured images as a basis for soft biometric/presentation attack detection. The hybrid liveness score can be based on the subject's specificity of the interaction between facial muscles and skin mechanics and formations. In particular, the expression-induced frown lines and wrinkles of a certain facial expression, or lack thereof, is utilized to generate the metric of similarity for soft biometric/presentation attack detection. For example, using a first gesture (e.g., scowling—or "class 1" gesture) and a second gesture (e.g., raising eyebrows or a neutral face—or "class 2" gesture), the hybrid liveness score can be calculated as a function of the similarity score and the dissimilarity score calculated using the first and second gestures. In some implementations, the hybrid liveness score can be calculated as: similarity between class 1 enrollment vs class 1 verification (e.g. match score (frown_enrollment, frown_verification)) plus dissimilarity between class 1 verification vs class 2 verification (e.g. 1/(match_score (frown_verification, raised_eyebrow_verification))). The similarity and the dissimilarity score can be normalized to 0-1. For a live user, the similarity score (where a run-time image with a particular face expression is compared to the enrollment image of the same expression) is high (e.g., close to 1) and the dissimilarity score (which is computed as the change between two expressions during run time) is low (e.g., close to 0). The hybrid liveness score is computed as:

hybrid_score =

$$w_{similarity} * \text{similarity\_score} + w_{dissimilarity} * \frac{1}{\text{dissimilarity\_score}}$$

The hybrid liveness score can be high for a live user and low for a presentation attack instrument. The weights $w_{similarity}$ and $w_{dissimilarity}$ can be determined using a trained machine learning model (e.g., a deep learning model such as CNN).

In some implementations, a threshold is determined based on the live and the spoof hybrid score distributions. The hybrid liveness score can be compared to the threshold to determine whether a subject is a real person or a presentation attack instrument.

In some implementations, the robustness of the technology against two-dimensional physical face swaps can be further improved by accounting for a dynamic score that quantifies the continuous nature in which an expression of a user changes from a first state (e.g., a neutral state as shown in FIGS. 2-4) to a second state (e.g., a smile or frown as shown in FIGS. 2-4). For example, a two-dimensional face swap is a presentation attack instrument in which images representing two facial expressions (neutral and smile) of the user are displayed in quick succession to simulate the user smiling to the camera.

The robustness against such presentation attacks can be improved by adding a dynamic score that indicates whether the subject's facial expression changes abruptly, or transitions smoothly from one state to another. For example, a sequence of images can be used to determine the presence of one or more interim or transition states as a subject's facial expression changes from a first state (e.g., a neutral expression) to a second state representative of a particular facial expression (e.g., a smile or a frown). Referring to the example of FIG. 2A, the image 202a corresponds to a first facial state (e.g., a neutral facial expression), the image 202c represents the second facial state (e.g., a smile in this example), and the image 202b is an interim image representing a transitional state between the first state and the second state. Similarly, referring to the example of FIG. 2B, the image 204a corresponds to a first facial state (e.g., a neutral facial expression), the image 204c represents the second facial state (e.g., raised eyebrows in this example), and the image 204b is an interim image representing a transitional state between the first state and the second state.

In some implementations, features of a first image in the sequence of images can be compared to subsequent frames. This can be done, for example, by using the CNN features of the first frame as the reference and computing the distance with the features of the subsequent frames—e.g., using cosine similarity—to produce a base signal. If a characteristic of the base signal (e.g., an absolute value of the first derivative) is above a threshold at any point, the subject in the sequence of images may be identified as a presentation attack instrument due to this abnormal, sudden change. The threshold can be determined, for example, by observing values produced by image swaps compared to normal expression changes, potentially using a machine learning process. In some implementations, regions of interest in successive images of the sequence can be registered with one another, and the registration error can be used as the base signal.

In some implementations, for determining the dynamic score, the face landmarks are first used to align the captured face images. The landmarks from the mouth region from each of these aligned faces are used to calculate the dynamic score. The distance between the two outer mouth corners (horizontally farthest) is computed for each aligned face image. The change between these computed distances tend to be monotonically increasing in nature for a live person (as illustrated in FIGS. 2A and 2B) whereas for a face-swap or partial face-swap presentation attack, the change is abrupt and constant after the swap.

In some implementations, deep learning architectures trained using a training corpus of images representing continuity of facial expressions can be used to determine the expression intensity probability score. The output expression intensity probability score for each aligned face image is predicted using the trained deep learning model. The change between these predicted expression intensities tend to be monotonically increasing in nature for a live person whereas for a face-swap or partial face-swap presentation attack, the change is abrupt and constant after the swap. For example, if multiple images are captured when the user is performing the facial expression a natural smooth variation in distance between the reference points is determined, reflecting a transition for a live user versus a face swap attack/2D static attack. The presence of a transitional state between multiple expressions (e.g., as represented by a dynamic score above a threshold) can be indicative of the captured images being of a real human being rather than of a face-swap or partial face-swap type presentation attack.

Figure 5:
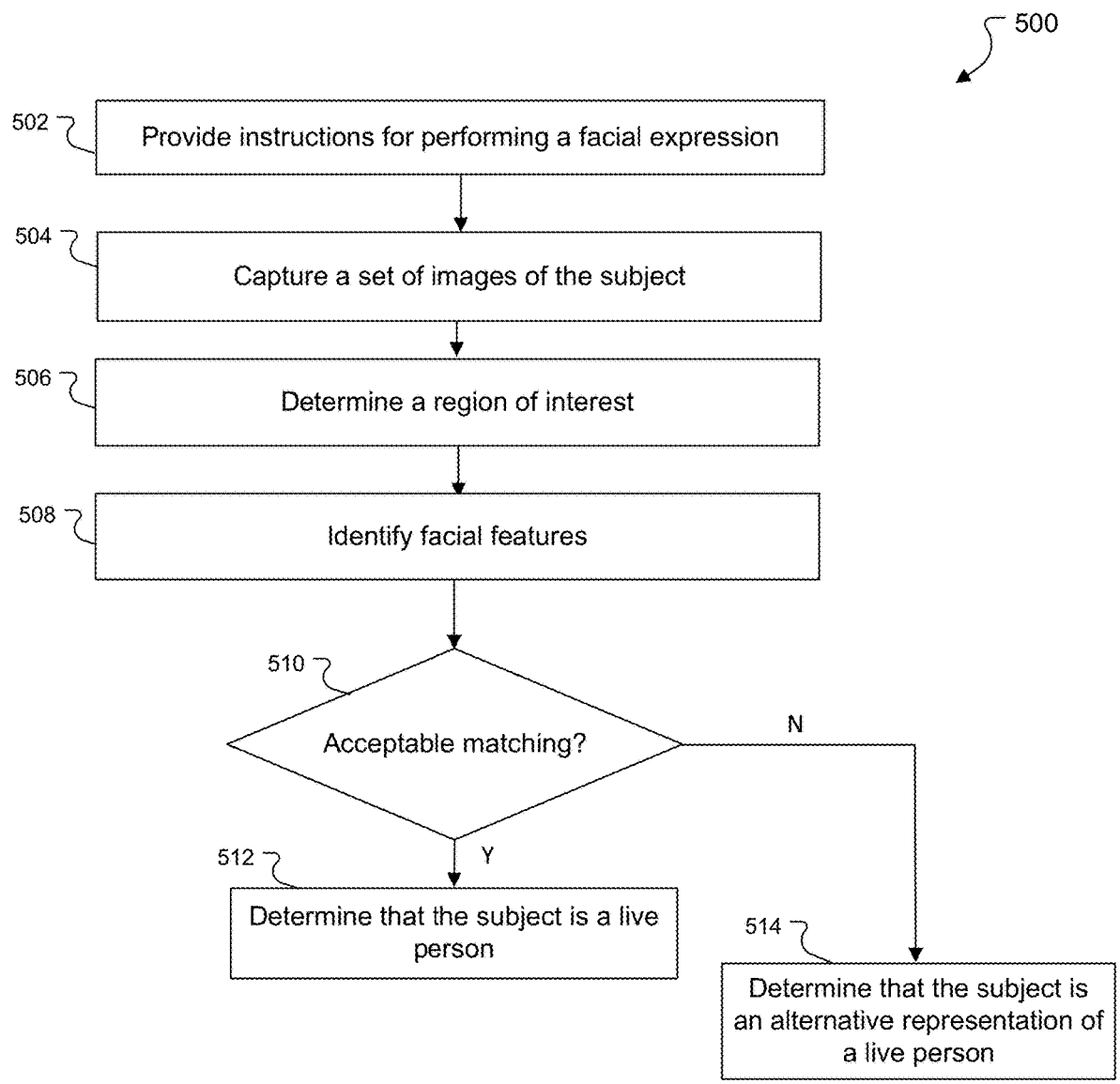
FIG. 5 is a flowchart of example processes that can be executed in accordance with implementations of the present disclosure.

FIG. 5 depicts an example process 500 for liveness detection. In some implementations, at least a portion of the process 500 can be executed by one of more components of the example architecture 100 described with reference to FIG. 1. In some implementations, at least a portion of the process 500 may be executed by the image analysis engine (e.g., 120 or 122 or 124) depicted in FIG. 1. In some implementations, at least a portion of the process 500 may be executed by one or more servers (e.g., authentication server 108 or computing devices in a distributed computing system) in communication with remote components such as one or more processing devices disposed within a user device (e.g., the user device 102 or the user device 104).

Instructions are provided to a subject to perform one or more facial expressions (502). In some implementations, a user device provides visual and audio commands instructing the subject to execute of the one or more facial expressions. For example, the user device can display schematic representations (e.g., icons) of the facial expressions on a display screen of the user device. The facial expression can be, for example, one of: a smile, a scowl, a frown, or raising eyebrows. The mobile device can display an animated image of an avatar of the subject in a user-friendly preview experience. In some implementations, the user device can direct the user to adjust a distance and a position relative to the camera to optimize visualization of the face of the subject (e.g., to maximize signal to noise ratio and to bring entire face of the subject in a capturing field of the camera of the user device, including a padding region). The user device can adjust a luminosity of the display or a light source to optimize visualization of the face of the subject.

A set of images of the face of the subject is captured as a response of the subject to the instructions to perform the facial expression (504). In some implementations, the set of images of the face of the subject is captured within a predetermined time period after the instructions were provided. The predetermined time period can be a few seconds long, such as 2 to 5 seconds long. During the predetermined time period, multiple images can be captured at a predetermined frequency (e.g., 1 kHz or higher) that ensures capture of at least one image without a facial expression and one image with the facial expression. In some implementations, the set of images includes an interim image that represents a transition between the image without the facial expression and the image with the facial expression. For example, at least one image can be captured for a neutral expression (image without the facial expression the subject is asked to perform), at least one image can be captured during the transitional phase, and at least one image can be captured for the particular facial expression. In some implementations, at least one image is captured before the instructions are provided, which can then be used as a reference image. The reference image can include one or more reference points or landmarks for extracting/cropping a region of interest.

A region of interest is determined for the facial expression in an image of the set representing a facial state that includes the facial expression (506). In some implementations, the region of interest is determined by applying an alignment stabilization method that uses reference points (e.g., facial landmarks) and by cropping a portion of the image relevant to the particular facial expression. In some implementations, if the sequence of images cannot be aligned or corrected (e.g., because they include too much motion), the image analysis engine can refrain from further processing of the images, and can request to restart the process 500 to recapture images for the same facial expression or a different facial expression (502). If alignment and correction are successful, the region of interest in the image can be extracted based on one or more facial landmarks. The facial landmarks can include, for example, the center of the eyes, location of eyebrows, locations of various portions of the lips, location of the nose, or any portion/characteristic of the face that can be used as a reference point for determining the locations/dynamics of the wrinkles, skin lines for the purposes described herein. The region of interest is determined based on the facial landmarks. For example, the eye centers can be used as reference points to identify the eye region in a face (e.g., using a bounding box that encompasses the eye centers). In some implementations, the entire face can constitute a region of interest.

The region of interest can be processed to identify a set of facial features in the region of interest (508). The facial features can be indicative of interaction between facial muscles and skin of the subject due to the subject performing the facial expression. In some implementations, the extraction of the facial features can include extraction of landmarks corresponding to a facial gesture/challenge. For example, raising eyebrows can also be inferred from locations (e.g., x, y coordinates) of eyebrow landmarks as compared to one or more reference points (e.g., eye landmarks). The landmarks can be derived using a model or regression based methods (e.g., using open source tools such as DLIB, mediapipe). In some implementations, the facial gesture scores can be used by themselves or combined with those derived from one or more image analysis techniques including edge detection, gradient calculation, histogram of oriented gradients (HOG) applied to the landmarks in the region of interest, or CNN. In some implementations, the facial features can be classified as the representations of the intended facial gesture as a part of a trained machine learning model, using, for example, one or more classifiers such as a neural network, support vector machine (SVM), and/or Bayesian classifiers.

In some implementations, image processing for identification of facial features can include identification of a presence of at least one transitional state as the subject's face changes to the facial state with facial expression from the neutral facial state that lacks the facial expression. The identification of the presence of at least one transitional state can include extraction of a facial expression motion. The points of interest identified in the reference image can be correlated to corresponding points identified in a subsequently captured image. A displacement of individual points between the two images can be calculated with respect to a reference point (e.g., intraocular distance) that is expected to remain constant or can be derived based on measured parameters. The incremental facial expression motion (between an image and the immediately subsequent image) and total facial expression motion (between the reference image the complete facial pose image) observed by the camera can be calculated. The facial expression motion can be calculated by using relative locations of corresponding points of interest (and those of similar matching pairs of points in the subsequent images), the estimated distance to the subject, one or more camera parameters (i.e. the calibration information on focal characteristics, etc.), a displacement map (e.g., temporal variation of the position of the points of interest), and a matrix that describes the difference in orientation of the face relative to the camera between multiple images. In some implementations, absence of incremental facial expression can trigger early termination of the process saving computational costs of the system, example, for 2D static spoofs, without incremental expression motion between the reference neutral image and the subsequent images.

The facial features are used to determine if a captured image with a facial expression matches a template image (510). In some implementations, the image matching process can be based on a comparison of a pattern defined by the facial features of the image with facial features in corresponding portions of a template image. In some implementations, the anti-spoofing metric can be based on a matching metric that is a function of a similarity of a captured image to the template image. In some implementations, the matching metric can be a function of a dissimilarity of a first captured image to a second image also captured at runtime, the second image representing a second facial state that lacks the facial expression in the first captured image. The similarity metric can be determined based on matching the captured facial expression to a reference facial expression (captured during enrollment and stored in a database, being accessible for verification processes). For example, the facial points of interest of the complete facial expression as captured during the liveness verification process 500 can be compared to pre-stored facial points of interest of the corresponding facial expression. In some implementations, the matching metric is a hybrid metric that is a function of both the similarity metric and the dissimilarity metric. In some implementations, the matching metric is compared to a threshold to determine if the captured image substantially matches the corresponding template image (or if a region of interest from the captured image substantially matches a corresponding region of interest in a template image).

In some implementations, the matching metric can be based on a dynamic metric related to the continuity of facial expressions/gestures. The one or more facial features can be used to determine a dynamic metric that represents a quantification of the continuity of a subject's facial expression motion. The quantification of the continuity of a subject's facial expression motion can be computed, for example, based on the magnitude of displacement of a point of interest relative to time, predicting the expression intensities. The magnitude of displacement of a point of interest relative to time (e.g., displacement trajectories) can be compared to one or more thresholds to separate the duration of the neutral phase (during which a neutral facial pose is captured) from a transition phase (during which a continuity of the facial expression is captured) and from the target facial expression phase (during which the target facial expression pose is maintained by the subject and captured by the user device). For example, if the magnitude of displacement of the point of interest varies less than 10%, between 2 or 3 subsequent images, it is considered that the subsequent images correspond to the same phase. If the magnitude of displacement of the point of interest varies more than 10%, between 2 or 3 subsequent images, it is considered that the subsequent images correspond to the transitional phase. In some implementations, these figures and thresholds are user-specific in that they are derived from the user's data during (a secure and trusted) enrollment process. In some implementations, the shape and/or the time derivative of the displacement trajectory of a facial point of interest is used to differentiate a continuous transition from the neutral phase to the facial expression phase. For example, a displacement trajectory of a facial point of interest matching a step function indicates an abrupt transition from the neutral phase to the facial expression phase (without a transition phase). If the displacement trajectory of a facial point of interest is different from a step function, the transition phase is extracted as the interval between two phases with substantially constant magnitudes of displacement, in which the neutral phase presents the smallest difference relative to a reference point (corresponding to an initial measurement time before facial expressions were requested). The dynamic metric can be expressed as a real numerical value within the interval 0 to 1 or as a percentage, where 0 (0%) represents an abrupt transition from the neutral pose to a particular facial expression and 1 (100%) indicates a continuous transition from the neutral pose to the facial expression. In some implementations, the matching process is based on a composite anti-spoofing metric that includes both matching metric and the dynamic metric.

At least one of the matching metric and the dynamic metric is compared to a threshold that defines acceptable matches. The matching metric can be compared to a matching threshold that defines a significant liveness measure according to matching criteria. The dynamic metric can be compared to a dynamic threshold that defines a significant liveness measure according to dynamic criteria, which can depend on a frequency of image capturing process or a number of transition images. The composite metric can be compared to a composite threshold that defines a significant match according to the matching and dynamic criteria. The comparison results can be used to determine whether the subject is a real human being or a presentation attack instrument.

In response to determining that the image with the facial expression substantially matches the template image and the dynamic metric exceeds the dynamic threshold, the subject is identified as a live person (512). If the subject is identified as a live person an output can be provided indicating the liveness detection result. The output can include a trigger to enable a communication of the user device performing the liveness detection with a secure system. In some implementations, identification that the subject is a live person includes a determination that one or more metrics is above the threshold, such that the liveness measure is considered acceptable.

Alternatively, in response to determining that the image with the facial expression fails to match the template image or the dynamic metric is below the dynamic threshold, the subject is identified as an alternative representation of a live person, such as a presentation attack instrument (514). If the subject is identified as an alternative representation of a live person an output can be provided indicating the liveness detection result. The output can include a trigger to prevent, block or interrupt a communication of the user device performing the liveness detection with a secure system. In some implementations, identification that the subject is an alternative representation of a live person includes a determination that one or all of the metrics are below respective thresholds.

In some implementations, a machine learning process (e.g., a deep learning process such as one that includes a CNN) can encompass one or more steps of the process 500. For example, one or more of the steps of: determining a region of interest (506), identifying facial features (508), determining the matching (510), and/or determining the subject as a real person of a presentation attack (512, 514) can be carried out as a part of a machine learning process. For example, such a machine learning process can accept as input a set of images (or regions of interest extracted therefrom) captured at runtime and provide as output an indication whether the subject is determined to be a real human being or a presentation attack instrument.

Operations of the process 500 can also include preventing, responsive to determining that the subject is the alternative representation of the live person, access to a secure system. In some implementations, controlling access to the secure system can include preemptively preventing any of the images to be further processed by the authentication server 108, thereby controlling access to the secure system. In some implementations, controlling access to the secure system can terminating an application of the user device and/or disabling a functionality of the user device for interrupting a network communication with a secure system for a predetermined duration. Controlling access to the secure system can improve performance of an underlying liveness detection system by filtering out spoof attacks at a front end, and thereby reducing waste of computational resources.

Figure 6:
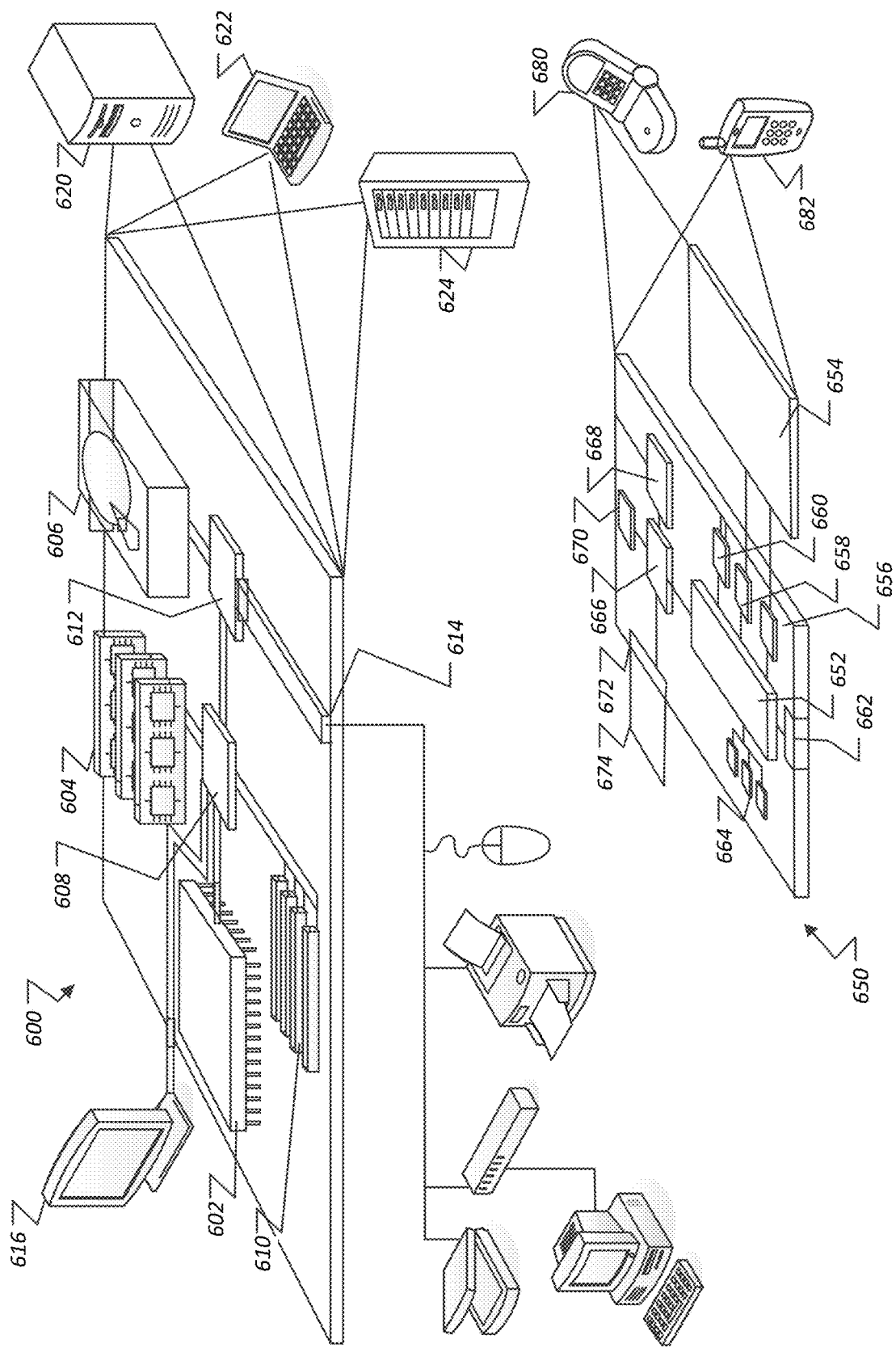
FIG. 6 is a schematic illustration of example computer systems that can be used to execute implementations of the present disclosure.

FIG. 6 shows an example of a computing device 600 and a mobile device 650, which may be used with the techniques described here. For example, referring to FIG. 1, the user device 104 can include one or more of the computing device 600, either in part or in its entirety. The user device 102 can include one or more of the mobile device 650, either in part or in its entirety. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. For example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. The sound may include sound from voice telephone calls, may include recorded sound (e.g., voice messages, music files, and so forth) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, tablet computer, or other similar mobile device.

The computing device 650 is configured to perform operations comprising providing instructions for performing a facial expression, capturing at set of images of a subject as a response of the subject to the instructions to perform the facial expression, determining a region of interest for the facial expression in a first image of the set, the first image representing a first facial state that includes the facial expression, identifying a set of facial features in the region of interest, the facial features being indicative of interaction between facial muscles and skin of the subject due to the subject performing the facial expression, determining, based on the facial features, that the first image substantially matches a template image of the facial expression of the subject, and in response to determining that the first image substantially matches the template image, identifying the subject as a live person. In some implementations, determining that the first image substantially matches the template image comprises: determining a matching metric as a function of a similarity of the first image to the template image, determining that the matching metric satisfies a threshold condition, and determining that the first image substantially matches the template image in response to determining that the matching metric satisfies the threshold condition. The matching metric is also a function of a dissimilarity of the first image to a second image of the set, the second image representing a second facial state that lacks the facial expression. The dissimilarity of the first image to the second image is calculated based on the facial features in the region of interest. The facial expression is one of: a smile, a scowl, a frown, or raising eyebrows. Determining a presence of at least one transitional state as the subject's face changes to the first facial state from a second facial state that lacks the facial expression. The matching metric comprises a score indicative of a degree of continuity from the second facial state to the first facial state.

Figure 7:
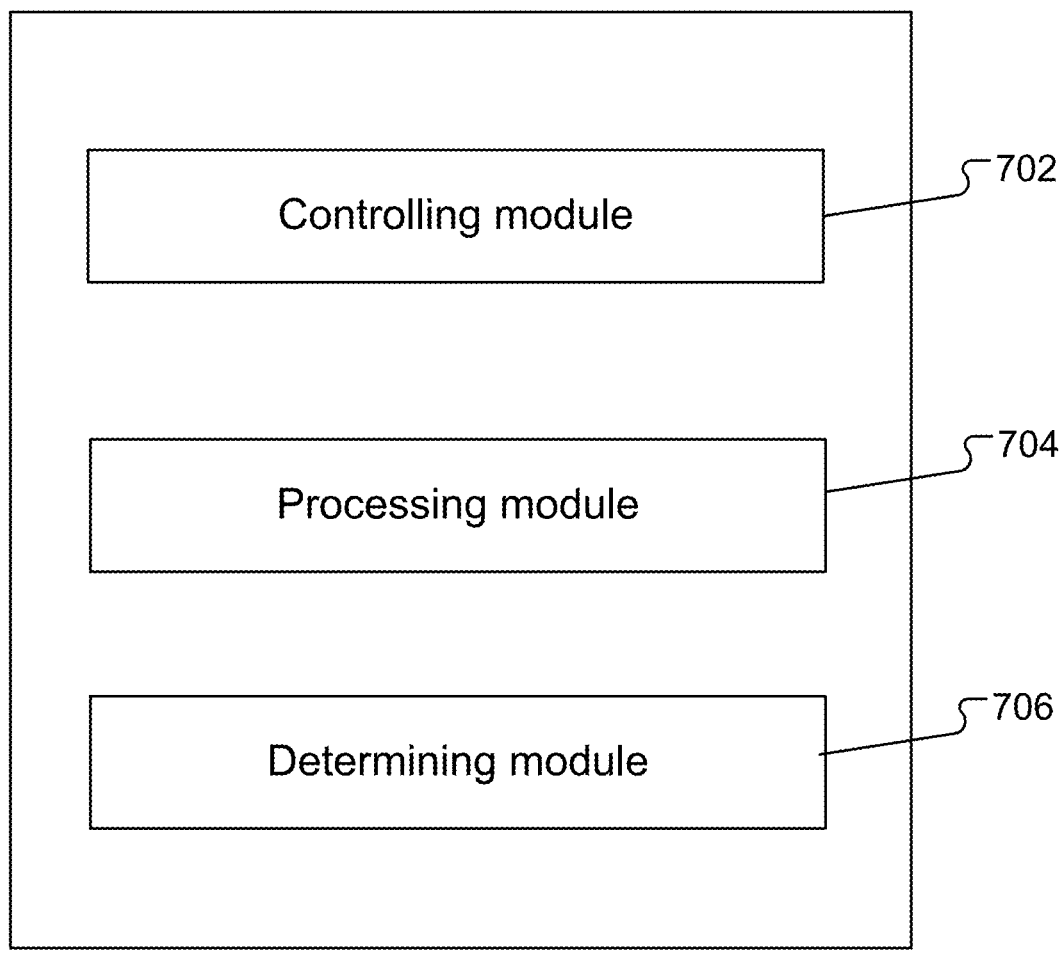
FIG. 7 depicts examples of modules of an apparatus in accordance with implementations of the present disclosure.

FIG. 7 depicts examples of modules of an apparatus 700 in accordance with one or more embodiments of the present disclosure. The apparatus can be an example of an embodiment of a system configured to perform liveness detection using an image of a facial expression. The apparatus 700 can correspond to the embodiments described above, and the apparatus 700 includes the following: a controlling module 702 that controls an image acquisition device to capture a sequence of images of a subject guided to perform a facial expression, and one or more images are captured; a processing module 704 that processes the images by a matched filtering process using the selected facial expression and a template facial expression of the subject; and a determining module 706 that determines that the subject is a live person or an alternative representation of a live person based on the facial expression matching. In response to determining that the subject is an alternative representation of a live person, the determining module 706 prevents access to a secure system.

In some embodiments, the alternative representation of the live person includes a photograph of the live person printed on paper, or presented on a display panel. In some embodiments, the alternative representation of the live person includes video replay of the live person on a display panel. In some embodiments, the determining module 706 determines that the subject is an alternative representation of a live person based on a composite matching metric that is calculated using a hybrid matching metric and/or a dynamic metric.

In some embodiments, the processing module 704 generates a composite matching metric that is calculated using a hybrid matching metric and/or a dynamic metric. The dynamic metric includes a score indicative of a degree of continuity from the second facial state to the first facial state. The hybrid matching metric is computed as a function of a similarity of the captured image to the template image (consisting of the same expression/gesture) and dissimilarity of the first image to a second image of the set of captured images, the second image representing a second facial state that lacks the facial expression, wherein the dissimilarity of the first image to the second image is calculated based on the facial features in the region of interest.

In some embodiments, the apparatus 700 includes a communication module that initiates a communication process with a secure system if the detection identified the subject as being a live person that is authorized to access the secure system.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display panel (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 210 of FIG. 2. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A computer-implemented method comprising:
providing instructions for performing a facial expression;
capturing at set of images of a subject as a response of the subject to the instructions to perform the facial expression;
determining a region of interest for the facial expression in a first image of the set, the first image representing a first facial state that includes the facial expression;
identifying a set of facial features in the region of interest, the facial features being indicative of interaction between facial muscles and skin of the subject due to the subject performing the facial expression;
determining, based on the facial features, that the first image substantially matches a template image of the facial expression of the subject; and
in response to determining that the first image substantially matches the template image, identifying the subject as a live person,
wherein determining that the first image substantially matches the template image comprises: determining a matching metric as a function of a similarity of the first image to the template image; determining that the matching metric satisfies a threshold condition; and determining that the first image substantially matches the template image in response to determining that the matching metric satisfies the threshold condition, and
wherein the matching metric further comprises a function of a dissimilarity of the first image to a second image of the set.

2. The computer-implemented method of claim 1, wherein the second image represents a second facial state that lacks the facial expression.

3. The computer-implemented method of claim 2, wherein the dissimilarity of the first image to the second image is calculated based on the facial features in the region of interest.

4. The computer-implemented method of claim 1, wherein the facial expression is one of: a smile, a scowl, a frown, or raising eyebrows.

5. The computer-implemented method of claim 1, further comprising determining a presence of at least one transitional state as the subject's face changes to the first facial state from a second facial state that lacks the facial expression.

6. The method of claim 5, comprising determining a matching metric as a function of a score indicative of a degree of continuity from the second facial state to the first facial state.

7. A non-transitory, computer-readable medium storing one or more instructions executable by a computer system to perform operations comprising:
providing instructions for performing a facial expression;
capturing at set of images of a subject as a response of the subject to the instructions to perform the facial expression;

determining a region of interest for the facial expression in a first image of the set, the first image representing a first facial state that includes the facial expression;

identifying a set of facial features in the region of interest, the facial features being indicative of interaction between facial muscles and skin of the subject due to the subject performing the facial expression;

determining, based on the facial features, that the first image substantially matches a template image of the facial expression of the subject; and in response to determining that the first image substantially matches the template image, identifying the subject as a live person, wherein determining that the first image substantially matches the template image comprises: determining a matching metric as a function of a similarity of the first image to the template image; determining that the matching metric satisfies a threshold condition; and determining that the first image substantially matches the template image in response to determining that the matching metric satisfies the threshold condition, and wherein the matching metric further comprises a function of a dissimilarity of the first image to a second image of the set.

8. The non-transitory, computer-readable medium of claim 7, wherein the second image represents a second facial state that lacks the facial expression.

9. The non-transitory, computer-readable medium of claim 8, wherein the dissimilarity of the first image to the second image is calculated based on the facial features in the region of interest.

10. The non-transitory, computer-readable medium of claim 7, wherein the facial expression is one of: a smile, a scowl, a frown, or raising eyebrows.

11. The non-transitory, computer-readable medium of claim 7, wherein the operations comprise determining a presence of at least one transitional state as the subject's face changes to the first facial state from a second facial state that lacks the facial expression.

12. The non-transitory, computer-readable medium of claim 11, wherein the operations comprise determining a matching metric as a function of a score indicative of a degree of continuity from the second facial state to the first facial state.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:

providing instructions for performing a facial expression, capturing at set of images of a subject as a response of the subject to the instructions to perform the facial expression, determining a region of interest for the facial expression in a first image of the set, the first image representing a first facial state that includes the facial expression, identifying a set of facial features in the region of interest, the facial features being indicative of interaction between facial muscles and skin of the subject due to the subject performing the facial expression, determining, based on the facial features, that the first image substantially matches a template image of the facial expression of the subject, and in response to determining that the first image substantially matches the template image, identifying the subject as a live person, wherein determining that the first image substantially matches the template image comprises: determining a matching metric as a function of a similarity of the first image to the template image; determining that the matching metric satisfies a threshold condition; and determining that the first image substantially matches the template image in response to determining that the matching metric satisfies the threshold condition, and wherein the matching metric further comprises a function of a dissimilarity of the first image to a second image of the set.

14. The system of claim 13, wherein the second image represents a second facial state that lacks the facial expression.

15. The system of claim 14, wherein the dissimilarity of the first image to the second image is calculated based on the facial features in the region of interest.

16. The system of claim 13, wherein the facial expression is one of: a smile, a scowl, a frown, or raising eyebrows.

17. The system of claim 13, further comprising determining a presence of at least one transitional state as the subject's face changes to the first facial state from a second facial state that lacks the facial expression.

* * * * *